Aug. 7, 1945.　　　F. R. MAXWELL　　　2,381,678
AIRPLANE WING
Filed Feb. 11, 1942　　　5 Sheets-Sheet 1
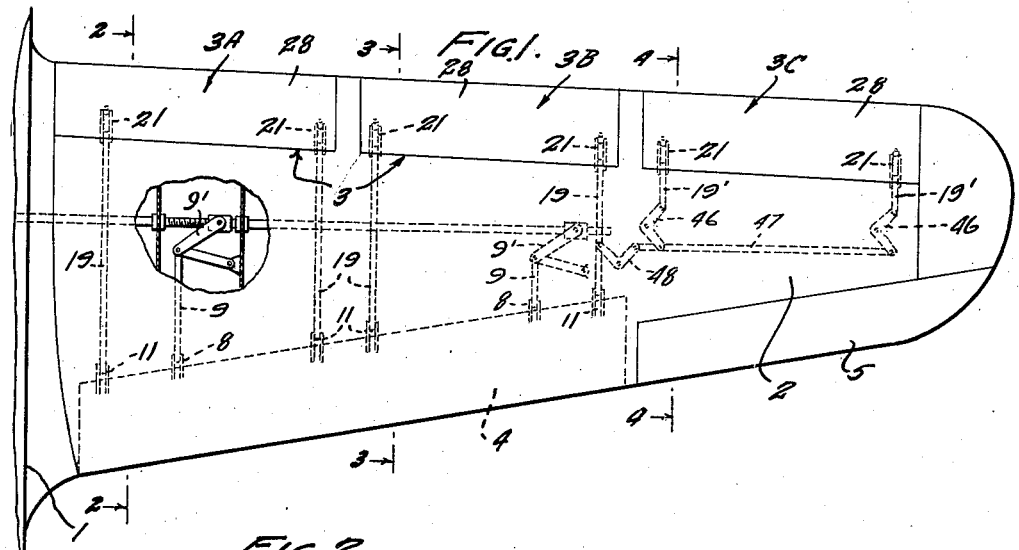
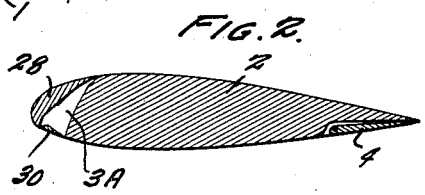
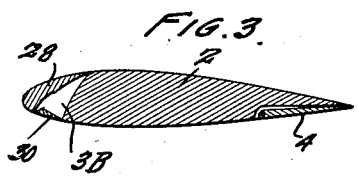
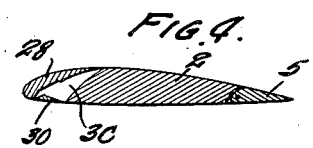
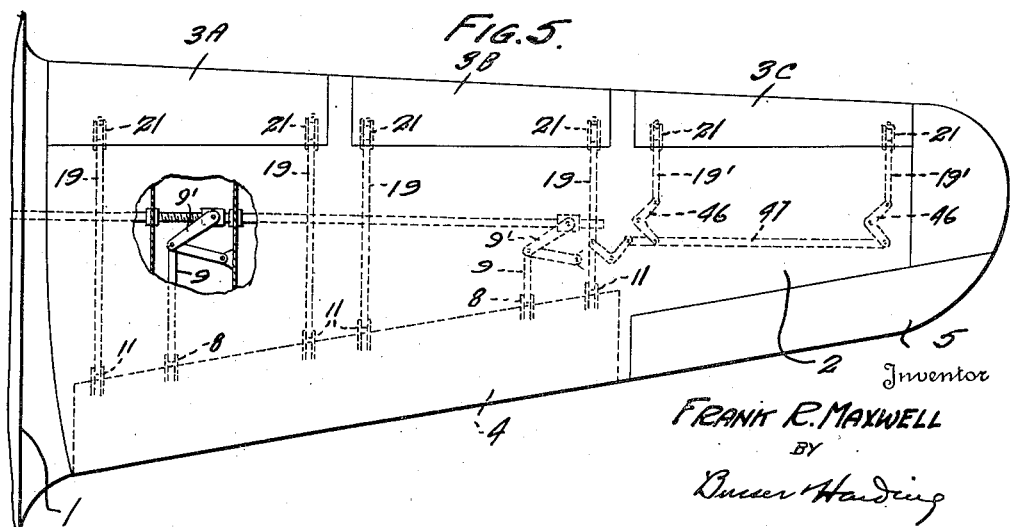
Inventor
FRANK R. MAXWELL
BY
Attorneys

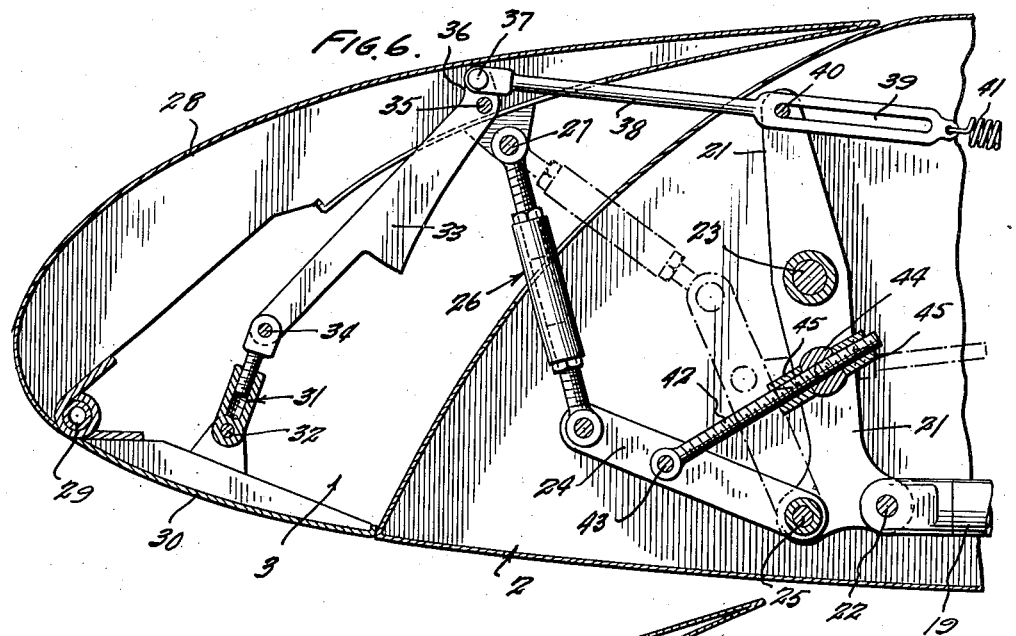

Aug. 7, 1945.  F. R. MAXWELL  2,381,678
AIRPLANE WING
Filed Feb. 11, 1942   5 Sheets-Sheet 3
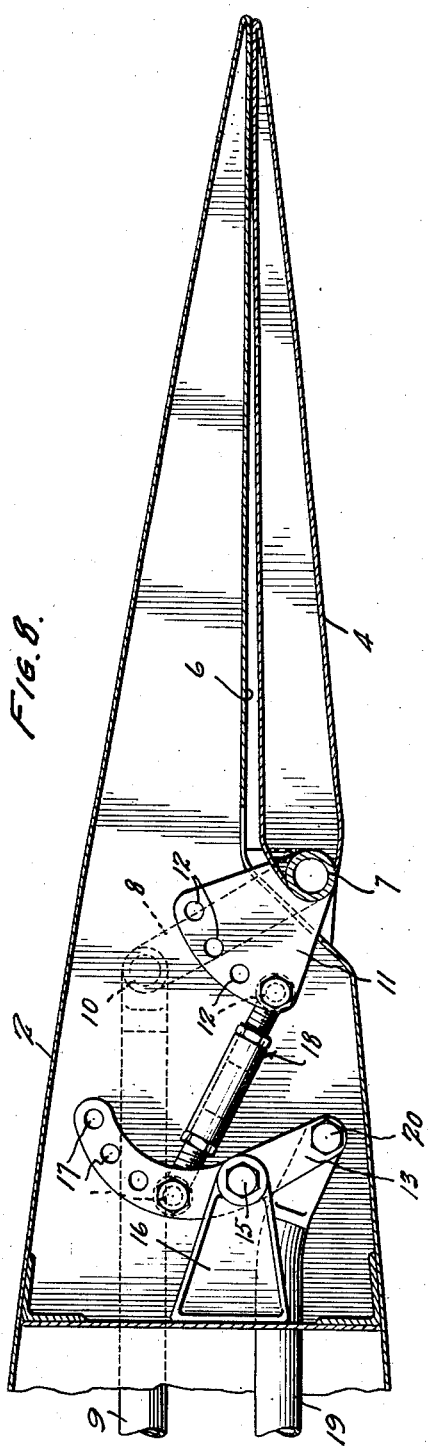
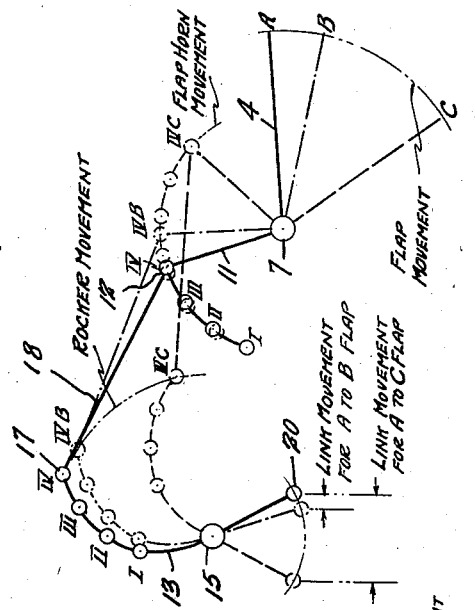
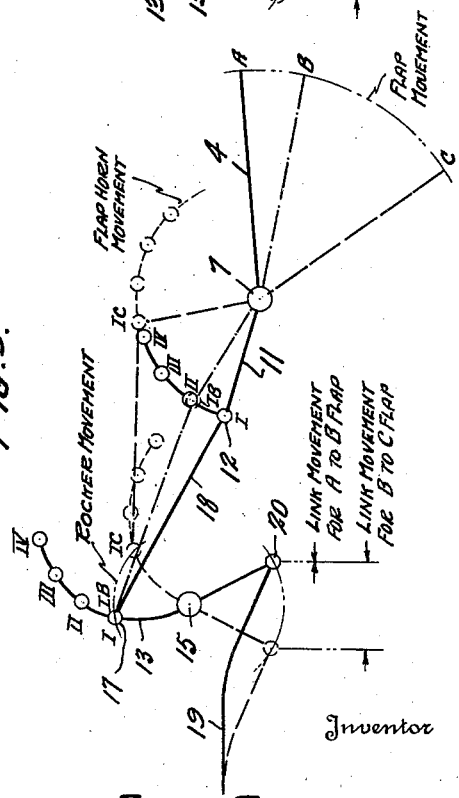
Inventor
FRANK R. MAXWELL
BY
Busser & Harding
Attorneys

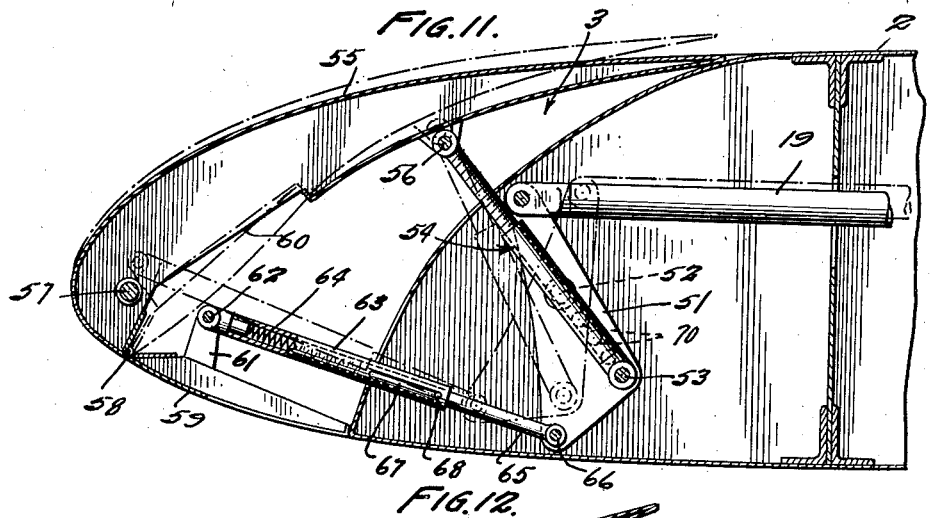
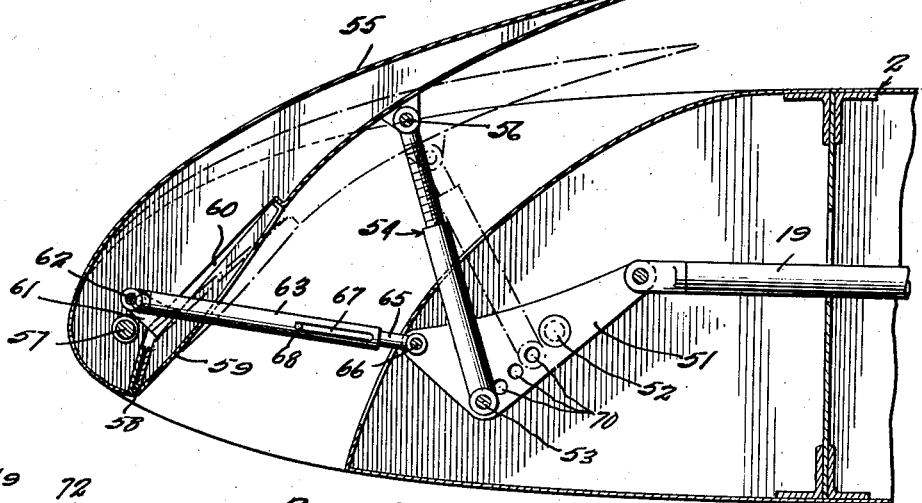
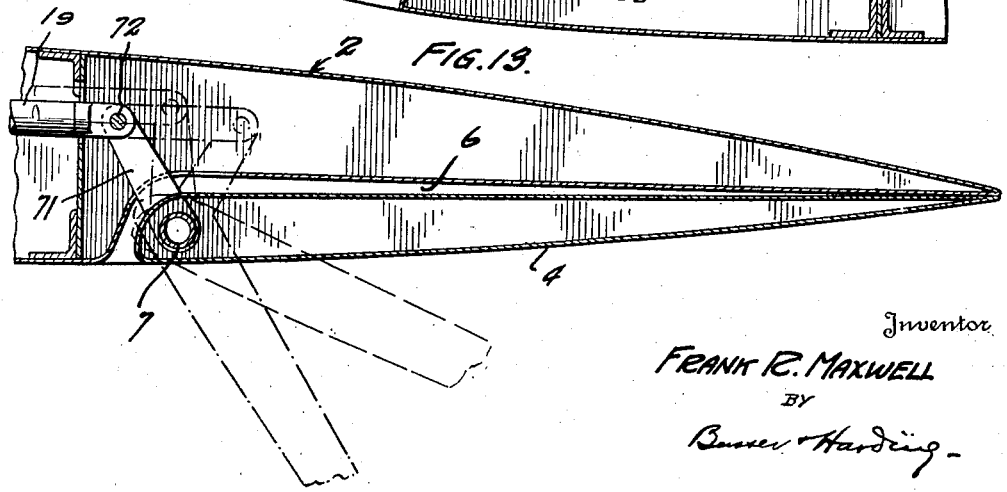

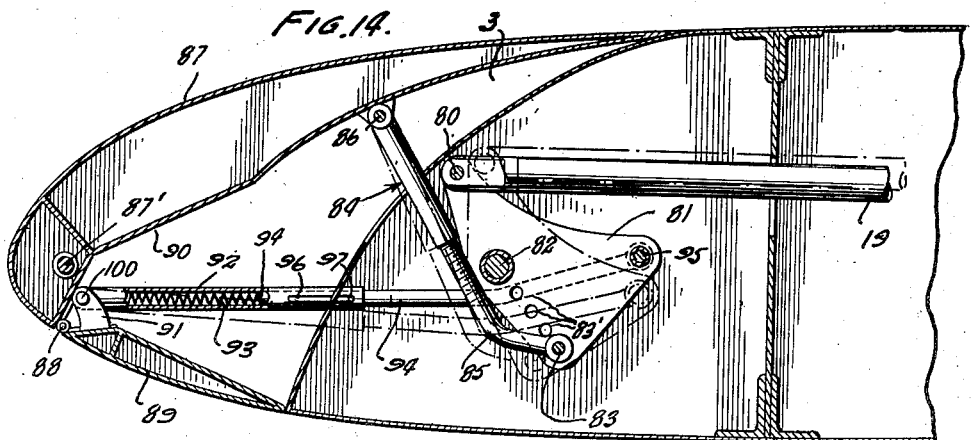
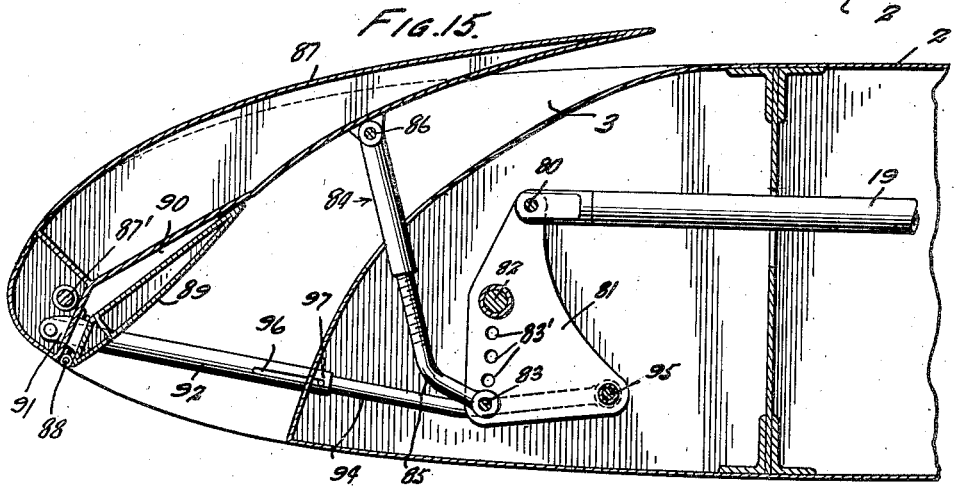
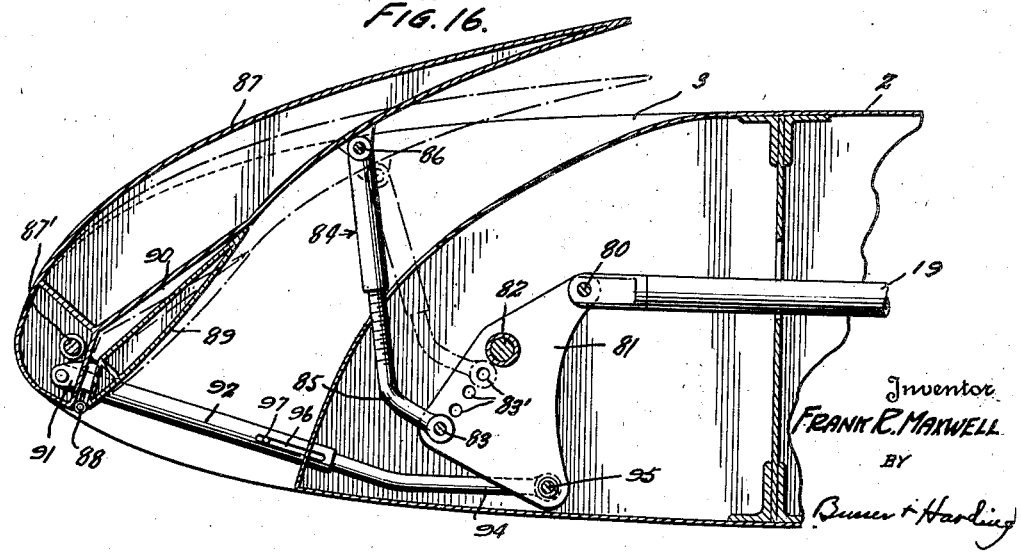

Patented Aug. 7, 1945

2,381,678

UNITED STATES PATENT OFFICE 2,381,678

AIRPLANE WING

Frank R. Maxwell, Rose Valley, Pa.

Application February 11, 1942, Serial No. 430,317

8 Claims. (Cl. 244—42)

This invention relates to an improvement in wings for airplanes and, more particularly, to an improvement in such wings of the type provided with means for forming a slot adjacent to the leading edge adapted to be opened in cooperation with operation of a rear flap.

Heretofore it has been known in airplane practice to provide a wing with means for forming a continuous slot extending adjacent the leading edge from the root of the wing to adjacent the tip, in order to increase the lift on the wing and enable lower flying speeds and consequently lower landing speed.

As will be appreciated, the purpose of the wing slot is to increase the angle of incidence at which the wing stalls and thereby increase the maximum lift of the wing. However, in many wings the angle at which the various sections of the wing stall varies from root to tip of the wing. Thus, for example, in the case of a tapered wing the section adjacent to the top usually stalls before the section adjacent to the root, and vice versa in the case of a straight wing.

Desirably, in order to obtain the maximum lift, a wing slot will be so designed that all portions of the wing will stall at approximately the same angle of incidence and that angle will be the largest attainable. Further, it is essential that that section of the wing near the tip, in the way of the aileron, or other means of lateral control, should not stall before the center section and, preferably, a little after the center section, so that lateral control may be maintained at and adjacent to the point of stall of the entire wing.

As will be apparent, the slots as heretofore used and of the continuous type are not effective to adjust the angle of incidence of a wing to the maximum obtainable amount and, at the same time, retain adequate lateral control, when the wing is of a type such that the natural angle of stall without slots varies in different sections throughout the lateral extension of the wing.

Now in accordance with this invention, I provide a wing having means for forming a slot which is effective to adjust the angle of incidence of a wing to the maximum amount with retention of lateral control up to the stall. The novel slot according to this invention comprises a plurality of sections, adjacent the leading edge and extending from the root to adjacent the tip of the wing.

More particularly, the several sections of the slot may be of different contour, of different length and of different width, or tapered, all respectively with relation to the portions of the wing and the chord thereof with which they are respectively related and the aerodynamic conditions obtaining with respect thereto. Further, the several sections may be at different angles relative to the chord of the wing.

Further, more particularly, means may be provided whereby the several sections forming the slot may be opened different amounts to the end that the angle of maximum lift may be varied throughout the extension of the wing with reference to the airodynamic effects obtaining in different portions of the wing when the effect of the slot is utilized.

Having now indicated in a general way the nature and purpose of this invention, I will proceed to a detailed description of a preferred embodiment with reference to the accompanying drawings, in which:

Figure 1 is a plan view, partly broken away, of a wing having a rear flap and provided with means for forming a slot comprising a plurality of sections according to this invention.

Figure 2 is a sectional view on line 2—2, Figure 1, looking in the direction of the arrows.

Figure 3 is a sectional view on line 3—3, Figure 1, looking in the direction of the arrows.

Figure 4 is a sectional view on line 4—4, Figure 1, looking in the direction of the arrows.

Figure 5 is a plan view, partly broken away, of a wing embodying a modification of this invention as shown in Figure 1.

Figure 6 is a fragmentary sectional view showing means for forming one of the slot sections in closed position with means for opening and closing the slot.

Figure 7 is a sectional view showing the subject of Figure 6 with the slot open.

Figure 8 is a fragmental sectional view of a flap in inoperative position and means for its operation.

Figures 9 and 10 are diagrammatic views exemplifying the cooperative movement of slot forming means and the flap.

Figures 11 and 12 are fragmentary sectional views showing modification of the means for opening and closing the slot, the slot being shown closed in Figure 11 and open in Figure 12.

Figure 13 is a sectional fragmentary view of a rear flap with modified means for manipulating it.

Figures 14–16 are fragmentary sectional views of other modified means for opening and closing the slot, the slot being shown closed in Figure 14 and open in Figures 15 and 16.

Referring to the drawings, the fuselage of an airplane is indicated at 1, while 2 indicates a wing. The wing is provided adjacent its leading edge with a slot generally indicated at 3, and formed in a plurality of sections 3A, 3B and 3C. The several slot sections are formed by means of upper slot covers 28 and lower slot covers 30 of any usual construction and mounting indicated in Figures 6 and 7. The wing is provided with a trailing edge flap 4 and an aileron 5.

As shown in Figure 1, the several sections forming the slot may respectively vary in width with relation to the chord of the wing, it being noted that the several sections as shown are of uniform width, but that, however, the chord of the wing varies in the extension of the wing from root to tip. However, as shown in Figure 5, a constant relation between slot width and wing chord may be maintained by, as shown, tapering the slot with the taper of the wing. Again, as shown in Figure 1, the slot sections may vary in length, it being noted that the middle section is shorter than the end sections.

With reference to Figures 2-4, it will be noted that the contour of the slot in cross section is varied in the several sections, the particular contour for the several sections being selected to give the maximum lift throughout the extension of the slot with reference to the stalling point of the wing at different points along its extension.

As has been indicated, the slot, comprising the sections 3A, 3B and 3C, is adapted to be opened in cooperation with operation of the trailing edge flap 4, it being noted that the several sections of the slot may be opened an equal amount or respectively in different amount, and in cooperation with operation of the trailing edge flap.

To such end an arm 8 (Figure 8) is attached at one end to the trailing edge flap 4, for example, to the hinge pintle 7 of the flap, which in usual manner is hinged to the wing and in inoperative position fits into a recess 6 in the underside of the wing, and at its other end to the rod 9, by a pivot 10. The rod 9 extends longitudinally of the chord of the wing and is connected to any suitable form of mechanism, as a screw and nut mechanism, indicated at 9' (Figure 1) with connection to operating means located conveniently to the pilot and adapted to exert a push or pull on the rod for lowering and raising the flap into and out of operative position. As will be apparent from an inspection of Figure 1, a plurality of arms and rods similar to arm 8 and rod 9 will be provided for the operation of the flap.

A segment 11, having a plurality of openings 12 adjacent to its periphery, is attached, for example, to the pintle 7 or otherwise to work with arm 8. The segment 11 is connected by an adjustable link 18 to a lever 13, pivotally mounted, as at 15, on a bracket 16 secured to an element of the internal structure of the wing. One arm of the lever 13 is connected to a rod 19, as at 20, while its other arm is extended and provided with a plurality of openings 17. It will be noted from an inspection of Figure 8 that the link 18 may be connected to the segment 11 through any one of the apertures 12 and to the lever 13 through any one of the apertures 17.

The arm 19 extends longitudinally of the chord of the wing and is pivotally connected, as at 22 (Figures 6-7) to an arm of a bell crank lever 21, which in turn is pivotally mounted, as at 23, on an element of the internal structure of the wing, at a point adjacent to the slot 3. To another arm of the lever 21 is attached, as at 25, a link 24 which in turn is connected to an adjustable link or turnbuckle 26, which in its turn is pivotally connected, as at 27, to the underside of the upper slot cover 28. The angularity of the link 24 may be adjusted with respect to the lever 21 by means of a threaded rod 42 pivotally connected at one end, as at 43, to the link 24 and extending through a nut 45 pivotally mounted, as at 44, on lever 21.

The third arm of the lever 21 is connected to a link 38, through a slot and pin connection 39, 40, Figures 6-7, the link 38 being in turn connected, as at 37, to a lever 33 pivotally mounted, as at 35, on the upper slot cover 28. The lever 33 is in turn connected, as at 34, to an adjustable link 31 pivotally mounted, as at 32, on the lower slot cover 30. A spring 41 is connected to the link 38 and to an element of the internal structure of the wing.

As will be appreciated from an inspection of Figures 1 and 5, a plurality of rods similar to rod 19 and connections therefrom to the upper and lower slot covers 28 and 30, as through levers similar to lever 21, are provided for the covers forming the sections of the slot, as, for example, sections 3A and 3B, opposite to the rear flap.

For operation of the covers 28 and 30 of the section 3C of the slot beyond the outer end of the rear flap, as shown in Figure 1, the outer rod 19 is connected to a rod 47 extending longitudinally of the wing by means of a lever 48 mounted in the wing and the rod 47 is connected to a pair of levers 21 through the medium of levers 46 mounted in the wing and short arms 19'.

For the operation of the covers 28 and 30 for the opening of the sections of the slot 3 in cooperation with operation of the rear flap 4, the adjustable links 18 are connected to the segments 11 and levers 13 for desired relative movement of the flap and slot covers. Thus, by reference to Figure 9, it will be noted that if the links are connected through the medium of the opening I in both the segment and lever, the lever 13 will not move to open the slot until the segment has turned substantially with consequent downward movement of the flap. Again (Fig. 10), if the connection between opening I in the lever and opening IV n the segment is made, the lever will be moved when the segment is moved with consequent opening of the slot when the flap starts to move downward. It follows that various opening of the slot as a whole or of its various sections respectively with respect to downward movement of the flap may be obtained by variously connecting the links 18 to the segments 11 and levers 13, as a whole or as they control the openings of the several slot covers respectively.

Again, the degree of opening of the slot covers, respectively, is adjustable through adjustment of the angularity of the links 24 with respect to the bell crank levers 21, through the medium of the threaded rods 42 and nuts 45.

The flap and slot cover operating mechanism having been adjusted for the desired timed opening of the sections of the slot with respect to the operation of the flap and for the degree of opening of the several sections of the slot, respectively, it is believed that the operation of the mechanism will be obvious, it being noted that, on operation by the pilot of the screw and nut 9' for lowering the flap 4 to an operative position, the segments 11 will be turned, causing the levers 13 to be rocked and to push the rods 19 forward. The forward movement of the rods 19 will cause the levers 21 to be rocked with the result that the upper and lower slot covers will be raised to open the slot sections 3A and 3B. The slot section 3C will be opened at the same time through the medium of lever 48, rod 47, levers 46 and rods 19'.

It will be noted that the connections between levers 21 and the lower slot cover and, more particularly, the slot and pin connection between links 38 and levers 21, together with the action of springs 41 on links 38, will permit the lower slot covers 30 to be fully opened in the initial opening movement of the upper slot covers 28, i. e., before the slots are effectively opened, and to permit them to remain in fully open position during the range of movement of the upper covers 28 for effective opening of the slot sections.

As has been indicated, the several slot sections may be opened in various timed relation to operation of the rear flap and respectively to different extent by adjustment of the links 18 with respect to the segments 11 and levers 13 and by adjustment of the angular relationship of the links 24 with respect to the levers 21 through the medium of threaded rods 42 and nuts 45.

Referring now to Figures 11 and 12, in which are shown modified means for opening and closing the slot, the push rod 19 is pivotally connected to a three armed lever 51, pivotally mounted as at 52 within the wing structure adjacent to the slot 3, a longitudinally adjustable link 54 is pivotally connected to another arm of the lever 51 as at 53 and to the upper slot cover 55 as at 56.

The lower slot cover 59 is provided with an arm 61, to which is pivotally connected a sleeve 63, within which is a spring 64 and within which extends a rod 65 pivotally connected to the lever 51 as at 66. The rod 65 is engaged with the sleeve 63 through the medium of a slot and pin connection 67, 68. For adjustment of the slot opening in the modification of Figures 11 and 12, it will be noted that the lever 51 is provided with a plurality of apertures 70 enabling the link 54 to be variously positioned in its connection with the lever 51. Thus, by connecting the adjustable link 54 with the lever 51 through different apertures 70, the full opening of the upper slot cover can be varied, as shown in full and dot dash lines Figure 12.

Further, it will be noted from an inspection of Figure 11 that when the slot cover is closed the pivot points 52, 53 and 56 are in line and hence forces acting to open the upper slot cover are not transmitted to other control surfaces.

With reference to Figure 13, it will be noted that the rear flap 4 is operated through the medium of an arm 71 mounted on the pintle 7 and pivotally connected to the push rod 19 at 72 in distinction from the arrangement shown in Figure 8.

Referring now to Figures 14-16, a lever 81 is pivotally mounted within the wing structure as at 82. The push rod 19 is pivotally connected to an arm of the lever as at 80. An adjustable link 84 is pivotally connected to the upper slot cover, as at 86, and to the lever 81 by means of a pin 83 passed through one or another of the apertures 83'. The apertures 83', it will be noted, extend in a line radially from the pivotal mounting 82 of the lever. The link 84 is bent to avoid interference with the pivot 82. The lower slot cover 89 is provided with an arm 91, to which is pivotally connected, as at 100, a sleeve 92 within which is a spring 93 and into which extends a rod 94 pivotally connected to lever 81, as at 95.

The sleeve 92 and the rod 94 are connected through the medium of slot and pin connection 96, 97.

By reference to Figure 14, in which the slot covers are shown to be in closed position, it will be noted that with the slot covers closed the pivots 83, 82, 86 are substantially in line, as are also the pivots 82, 95 and 100.

The in line relationship of the pivotal connections indicated will, as will be appreciated, prevent the forces acting upon the upper slot cover and upon the lower slot cover from operating to open these covers, and it will also prevent transmission of such forces to other portions of the mechanism.

As shown in Figure 16, various opening of the upper slot cover may be obtained by use of one or another of the openings 83' for connection of the adjustable link 85 to the lever 81. As will be appreciated, the lower slot cover, due to the construction of the member connecting the arm 91 with the lever 81, will be fully opened when the upper slot cover is opened, irrespective of the adjustment for amount of opening of the upper slot cover.

The several slot sections may be given the same or different contours and the several sections may vary in width proportionally to the chords of the wing or be constant with respect thereto.

As will be obvious from the foregoing description, the wing 2 provides a main airfoil section while the upper slot covers 28 form auxiliary airfoil sections arranged relative to the leading edge of the main section 2 to form the slots 3A, 3B, 3C. The profile sections of the covers, or auxiliary airfoil sections 28, respectively are of different contour, it being noted from an inspection of Figures 2, 3 and 4 that the angles of incidence of the several auxiliary airfoil sections are different, and that more specifically the angles of incidence of the sections respectively diminish in a direction from the root toward the tip of the main section, i. e., the angles of incidence of the auxiliary airfoil sections forming the slot 3B (Fig. 3) is less than that of the auxiliary airfoil section forming the slot 3A (Fig. 2) and that of the auxiliary airfoil section forming the slot 3C (Fig. 4) is less than that of the auxiliary airfoil section forming the slot 3B (Fig. 3). As will also be obvious, if a single auxiliary airfoil section, in place of a plurality of auxiliary airfoil sections, is provided to form a single slot, profile sections of the auxiliary airfoil section taken at different points in its longitudinal extension will be of different contour.

It will now be appreciated that by virtue of this invention a slot extending effectively from the root of a wing to adjacent its tip, is provided which aerodynamically will exactly complement the various aerodynamic conditions obtaining in the various parts of the wing in its longitudinal extension so that maximum lift effect will be obtained from the slot without negative effect upon lateral stability.

It will be appreciated that it is not intended that this invention shall be limited to the details of construction described herein, it being obvious that various structural modification may be made without departing from the scope of the claims appended hereto.

What I claim and desire to protect by Letters Patent is:

1. An airfoil comprising a main airfoil section and an auxiliary airfoil arranged relative to the leading edge of the main section to form a slot, said auxiliary airfoil being characterized by the fact that the angle of incidence of the profile sections thereof taken at a plurality of different points in its longitudinal extension diminishes progressively in a direction from the root toward the tip of the main airfoil section.

2. An airfoil comprising a main airfoil section and an auxiliary airfoil movable relative to the leading edge of the main section and adapted to be positioned to form a slot, said auxiliary airfoil being characterized by the fact that profile sections thereof taken at a plurality of different points in its longitudinal extension are of different contour.

3. An airfoil comprising a main airfoil section and an auxiliary airfoil movable relative to the leading edge of the main section and adapted to be positioned to form a slot, said auxiliary airfoil being characterized by the fact that profile sections thereof taken at a plurality of different points in its longitudinal extension have different angles of incidence.

4. An airfoil comprising a main airfoil section and an auxiliary airfoil movable relative to the leading edge of the main section and adapted to be positioned to form a slot, said auxiliary airfoil being characterized by the fact that the angles of incidence of profile sections thereof taken at a plurality of different points in its longitudinal extension diminish progressively in a direction from the root toward the tip of the main airfoil section.

5. An airfoil comprising a main airfoil section and a plurality of auxiliary airfoils movable relative to the leading edge of the main section and adapted to be positioned to form a plurality of slots extending successively in a direction from the root to the tip of the main airfoil section, said auxiliary airfoil sections being characterized by the fact that their profile sections respectively are of different contour.

6. An airfoil comprising a main airfoil section and a plurality of auxiliary airfoils movable relative to the leading edge of the main section and adapted to be positioned to form a plurality of slots extending successively in a direction from the root to the tip of the main airfoil section, said auxiliary airfoil sections being characterized by the fact that their profile sections respectively are of different length.

7. An airfoil comprising a main airfoil section and a plurality of auxiliary airfoils movable relative to the leading edge of the main section and adapted to be positioned to form slots, said auxiliary airfoils being characterized by the fact that profile sections thereof taken at a plurality of different points in the longitudinal extensions thereof are of different contour, and further characterized by the fact that means are provided for moving the auxiliary airfoils respectively to a different extent relative to the leading edge of the main airfoil section.

8. An airfoil comprising a main airfoil section and a plurality of auxiliary airfoils movable relative to the leading edge of the main section and adapted to be positioned to form a plurality of slots extending successively in a direction from the root to the tip of the main airfoil section and means for moving the auxiliary airfoils respectively relative to the leading edge of the main airfoil section to position the several auxiliary airfoils respectively at different angles of incidence relative to the main airfoil section.

FRANK R. MAXWELL.